United States Patent [19]

Bezella et al.

[11] Patent Number: 5,067,400
[45] Date of Patent: Nov. 26, 1991

[54] SCREEN PRINTING WITH AN ABRASIVE INK

[76] Inventors: Gary L. Bezella; Steven T. Bezella, both of 5124 Island View Dr., Oshkosh, Wis. 54901

[21] Appl. No.: 470,144

[22] Filed: Jan. 25, 1990

[51] Int. Cl.⁵ .............................................. B41F 15/00
[52] U.S. Cl. ..................................... 101/129; 15/208; 51/400; 106/20; 427/197; 427/282
[58] Field of Search ............... 15/208, 209 B; 51/394, 51/395, 398, 400, 401, 407; 101/491, 129, 114; 427/199, 197, 282; 106/20

[56] References Cited

U.S. PATENT DOCUMENTS

| D. 119,767 | 4/1940 | Ruth | 15/208 X |
|---|---|---|---|
| 2,690,385 | 9/1954 | Richlin | 15/208 X |
| 2,804,728 | 9/1957 | Politzer et al. | 51/400 |
| 4,270,985 | 6/1981 | Lipson et al. | 101/491 X |
| 4,636,257 | 1/1987 | Baudry et al. | 101/114 X |

FOREIGN PATENT DOCUMENTS

| 208928 | 12/1955 | Australia | 15/208 |
|---|---|---|---|
| 0084663 | 6/1980 | Japan | 101/129 |
| 0017957 | 4/1984 | Japan | 101/491 |
| 2199883 | 9/1987 | Japan | 101/129 |

*Primary Examiner*—Clifford D. Crowder
*Attorney, Agent, or Firm*—Thomas D. Wilhelm

[57] ABSTRACT

Modified ink, method of printing, and articles printed therewith. Abrasive particles are combined with a conventional ink formulation. The ink, including the abrasive particles, is pushed through a conventional screen printing screen and printed onto a substrate, whereby the surface of the substrate acquires an abrasive texture in the areas so printed.

18 Claims, 1 Drawing Sheet

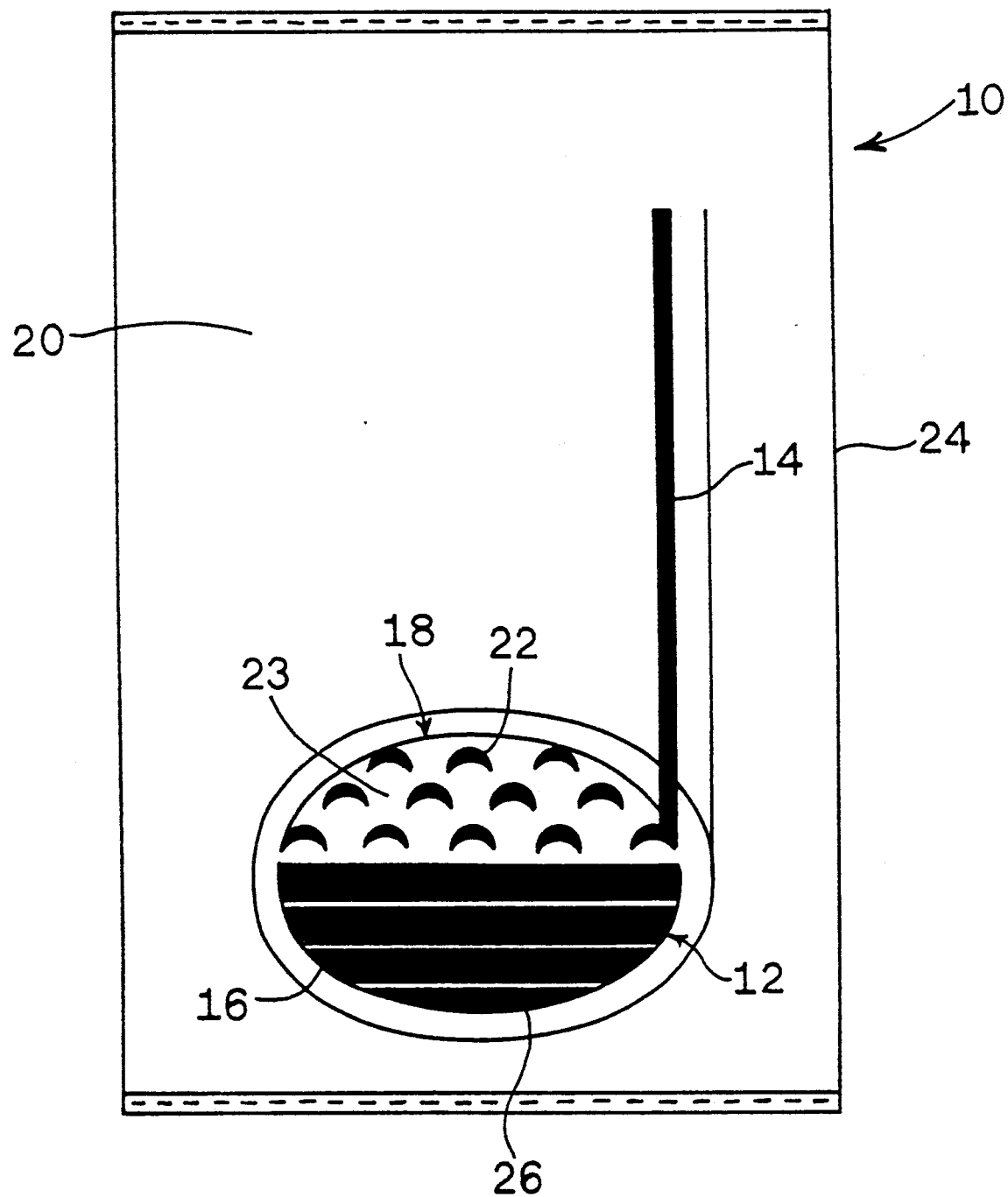

SCREEN PRINTING WITH AN ABRASIVE INK

BACKGROUND OF THE INVENTION

This invention relates to screen printing. In conventional screen printing, a relatively viscous ink is placed onto a screen and is forced through the screen, and onto an underlying substrate, by the wiping action of a squeegee or the like.

Typically, the ink formulation is selected such that the presence of the ink on the substrate does not significantly change the characteristics of the substrate surface other than visually.

It is an object of this invention to provide a modified screen printing ink which includes abrasive particles therein.

It is another object to print/ through a screen, using an ink modified with abrasive particles, which ink, when applied to a soft or smooth substrate, imparts an abrasive characteristic to the substrate surface, in addition to the typical visual printed appearance.

It is still another object to provide an article comprising a substrate which generally does not have an abrasive surface, and which has an abrasive area printed thereon.

SUMMARY OF THE DISCLOSURE

Some of the objects are achieved in a method of printing wherein an ink is pushed through a screen which has a mesh count, a mesh opening, and an open surface percentage. The method comprises the steps of selecting, as an ink base, a standard screen printing ink having a viscosity, at ambient conditions, of about 2000 to about 50,000 centipoise, preferably about 10,00 0 to about 30,000 centipoise, combining, with the ink base, hard abrasive particles to form a modified abrasive ink formulation, the hard abrasive particles being cooperatively sized to readily pass through the mesh opening in the screen, mixing the modified ink and thereby obtaining a uniform dispersion of the particles in the ink base, pushing the modified ink formulation through the screen, onto a printing substrate, and thereby printing the abrasive ink formulation onto the substrate, and drying the ink on the substrate.

The resulting printed substrate exhibits an abrasive texture.

Preferably, the relative amounts of the abrasive particles to the ink particles are about 2 ounces to about 70 ounces of abrasive particles per gallon of ink base.

Preferably, the substrate has a definable unit surface area, and the method includes the step of selecting a particular print pattern comprising between about 5% and about 70% of the unit area of the substrate, creating a pattern on the screen corresponding to the selected print pattern, and printing the modified ink on the substrate, in that selected pattern, through the patterned screen.

In some embodiments, the method includes selecting, as components of the print pattern, a first area comprising a solid print portion wherein the abrasive ink covers from about 80% to about 100% of the surface of the first area, a second area comprising a pattern portion wherein about 10% to about 80% of the surface of the second area is printed by the abrasive ink formulation, and a third area comprising less than 10% coverage by the abrasive ink formulation.

The preferred substrate is a compressible absorptive fabric, such as the looped fabric commonly known as terry cloth.

Others of the objects are embodied in the printed substrates printed according to the above methods. Especially, the invention embodies an absorbent towel having a definable unit surface area on one side thereof, the towel comprising a printing substrate, and having printing thereon, between about 5% and about 70% of the unit surface area comprising printing with an abrasive ink wherein the ink comprises hard abrasive particles distributed therein, and wherein the corresponding portion of the surface area is more abrasive than that portion which is devoid of the abrasive ink.

In preferred embodiments of the towel, the towel comprises a first area comprising a solid print portion wherein the abrasive ink covers from about 80% up to 100% of the surface of the first area, a second area comprising an intermittent pattern portion wherein about 10% to about 80% of the surface of the second area is printed by the abrasive ink formulation, and a third area comprising less than 10% coverage by the abrasive ink formulation.

Further, the invention comprises an ink composition adapted for screen printing onto a substrate by pushing the ink composition through a screen. The ink composition comprises as an ink base, a standard screen printing ink comprising a colorant, a resin, and a solvent. The ink base typically has a viscosity, at ambient conditions, of about 2000 to about 50,000 centipoise, preferably about 10,000 to about 30,000 centipoise. The composition further comprises abrasive particles uniformly dispersed in the ink base, the abrasive particles being cooperatively sized to pass through the screen.

In preferred embodiments of the ink composition, the relationship between the amount of abrasive particles and the amount of the ink base is about 2 ounces to about 70 ounces of abrasive particles per gallon of ink base.

BRIEF DESCRIPTION OF THE DRAWING

The drawing shows a plan view of a towel printed according to this invention.

DETAILED DESCRIPTION OF THE ILLUSTRATED EMBODIMENT

Referring now to the drawing, a towel 10 is printed with an abrasive ink in a pattern which represents the lower portion of a golf club. The pattern includes the club head 12 and the lower portion 14 of the corresponding handle.

The printing on the towel 10 includes a first area 16, defined generally by the lower half of club head 12. The first area 16 is covered over substantially all of its surface area by the print pattern of abrasive ink.

A second area 18, defined generally by the upper half of club head 12, is printed with a pattern portion wherein the abrasive ink covers an intermediate fraction of the surface of the second area.

A third area 20, defined outside the club head 12 has the abrasive ink printed over less than 10% of its surface area.

The three areas 16, 18, and 20 of towel 10 serve three different purposes, all on the same substrate. The first area 16 provides a generally uniform abrasive surface for initial removal of unwanted material from, for example, a golf club.

The second area 18 provides abrasive properties on the illustrated islands 22 of abrasive printing, in combination with soft wiping properties in the surrounding areas 23 which are inside the area defined by the club head 12 and not printed with abrasive ink. Area 18 is thus useful where a combination of abrasive and soft wiping is desirable, such as to wipe away material which has been loosened by the action of abrasive area 16.

The generally unprinted area 20 provides normally absorbent and soft properties of a conventional towel, such as for further (e.g., final) wiping and cleaning of material loosened by the use of areas 16 and 18.

Accordingly, a substrate treated with the abrasive ink as described herein can function as an abrasive material (area 16), as a combination abrasive and soft wiping material (area 18), and can function according to the properties inherent in the substrate 24 onto which the ink is printed (area 20).

The substrate 24 onto which the ink 26 is printed is an absorbent cloth, or cloth-like material in the illustrated example. The substrate can be a woven or non-woven material. A preferred substrate is a conventional terry cloth towel which comprises a woven base combined with loops extending laterally from the woven base. In some embodiments, the loops have been sheared, whereby the loops are discontinuous.

The printed pattern as shown in the drawing, is preferably applied in a screen printing process. In that process, a screen is prepared by blocking (e.g., with a photoreactive resin emulsion) that portion of the screen which is not intended to pass ink. Accordingly, the unblocked or open screen pattern represents the pattern to be printed.

The area of the substrate, or unit of the substrate, which is printed with abrasive ink generally represents about 5% to about 70% of the overall area, preferably 7% to 50%, most preferably 7% to 25%.

The ink conventionally used in screen printing processes generally comprises (i) a carrier which includes the solvents, surfactants, extenders, dispersants, and the like, (ii) a resin, and (iii) the colorant. Typical of such inks is the Spectrasperse family of inks available from Spectrachem Corporation, Paterson, N.J. Typical viscosity of such inks is about 10,000 to about 30,000 centipoise.

The ink used in this invention, which invention provides abrasive properties to the substrate, preferably comprises a conventional screen printing ink such as the above described Spectrasperse inks, as an ink base, combined with abrasive particles. The abrasive particles are combined with the ink base in the amount of about 2 ounces to about 70 ounces of abrasive particles per gallon of ink base, preferably about 6 to about 16 ounces per gallon. If less than 2 ounces of abrasive particles are used, the abrasive affect on the towel is so small as to be of little functional value. If greater than 70 ounces is used, it is difficult to obtain clean passage of the ink/particles combination through the printing screen.

A preferred upper limit is 20 ounces of abrasive particles per gallon, as this results in significant abrasive properties in the pattern printed on the substrate, and is easily processed through the printing screen. As the amount of abrasive is increased above 20 ounces, the ink becomes less fluid, until, at about 70 ounces per gallon, it is difficult to push the ink through the printing screen.

Also, as the amount of abrasive particles is increased, there is less ink holding a typical one of the particles in the ink/abrasive mixture, whereby some of the abrasive particles can be more easily removed by friction, rubbing or the like after the printed ink dries. Accordingly, a preferred upper limit for the amount of abrasive particles is 20 ounces per gallon of ink base.

Inks above the lower viscosity limit of 2000 centipoise, and below the preferred lower limit of 10,000 centipoise, can be used, but provide a less preferred amount of lubrication between the screen and the abrasive particles. Inks above the preferred upper limit of 30,000 centipoise, and below the recited upper limit of 50,000 centipoise, can be used, but have less than the optimum fluidity. Accordingly, the preferred viscosity for the ink base, in order to have good fluidity, and to provide good lubricity between the abrasive particles and the screen, is between about 10,000 centipoise and about 30,000 centipoise.

A suitable screen for use in printing with the modified ink of this invention is comprised of nylon monofilament, 40-mesh (strands per inch) having an opening of 450 microns across the openings. Such screens are available, for example, under the tradename NITEX, from Advance Process Supply Company, Chicago, Ill. Other screen materials conventionally used in screen printing screens are acceptable (e.g. stainless steel).

Illustrative suitable abrasive particles are available as conventional screened silica sand, which inherently has sharp edges. The sand is preferably white, whereby it has little if any effect on the final coloring properties of the ink. A preferred sand having the desired rough-edged particles of abrasive nature is available from New York Bronze Company, Elizabeth, N.J., under the trade name SLIP NO MORE. Typical size distribution, using ASTM E-11 is:

| Screen Size Openings Per Inch | Opening Microns | Percent Retained |
| --- | --- | --- |
| 50 | 300 | 4% |
| 100 | 150 | 73% |
| 200 | 75 | 22% |
| pass 200 | — | 1% |

The above size distribution is illustrative only, and with respect to the correspondingly recited screen specifications. Coarser abrasive particles can be used, with larger screen openings. Finer particles can also be used. The screen opening must be large enough to pass both the ink and the particles being used. The abrasive particles are not limited to silica sand. Rather, any material is acceptable so long as its abrasive properties operate similar to the abrasive properties of silica sand. The abrasive material can be organic or inorganic.

A typical method of practicing the invention is as follows. An appropriate ink base composition is prepared and thoroughly mixed, including the carrier, the resin, and conventional colorant ingredients, as defined above. The preferred ink base comprises, generally, a standard water-based screen printing ink. The ink base is combined with the selected amount of abrasive particles, for example 8 to 12 ounces of abrasive particles per gallon of ink. The size distribution of the abrasive particles is selected, cooperatively with the screen mesh opening, such that the abrasive particles will readily pass through the screen when combined with the ink base. Generally, the greater the fraction of abrasive particles, the greater the abrasive properties of the printed article.

Once the ink base and the particles are combined, they are thoroughly mixed to obtain uniform dispersion of the abrasive particles in the ink base to make a modified ink composition having uniform properties throughout the quantity so made.

The modified ink composition so made is placed on the printing screen and is pushed through the screen, using the normal squeegee operation, to deposit ink onto the printing substrate.

The printed substrate is treated to the same drying and curing conditions as are normally practiced with screen printing. Typically, drying and curing are accomplished by heating the printed substrate in a forced air oven at, for example, 300 degrees Fahrenheit for three minutes.

The printed article, after such drying and curing, is ready for use. Especially the resin component of the ink base provides the holding medium which both bonds to the substrate and provides a sufficiently surrounding matrix that it holds the abrasive particles at their respective locations upon curing of the printed ink. Thus the ink base serves the holding and securing function, keeping the abrasive particles secured at their locations on the printed article.

INK EXAMPLE 1

Approximately one gallon of an ink composition is made by combining, and thoroughly mixing together, (a) 3395 grams of clear base RFU-101 from Spectrachem Corporation, (b) 115.5 grams of pigments, and (c) 340 grams of the above described sand sold under the trade name SLIP NO MORE. RFU-101 clear base includes both the carrier as defined above and a sufficient amount of resin for addition of up to 10% by weight pigment.

INK EXAMPLE 2

Approximately one gallon of an ink composition is made by combining, and thoroughly mixing together, (a) 3622 grams of clear base RFU-101, (b) 90.5 grams of pigments, and (c) 340 grams of SLIP NO MORE sand.

INK EXAMPLE 3

Approximately one gallon of an ink composition is made by combining, and thoroughly mixing together, (a) 10,500 grams of PEARL SILVER 101-X5 ink base from Spectrachem Corporation, (b) 5.5 grams of pigments, and 227 grams of SLIP NO MORE. The Pearl Silver ink base includes metallic flakes.

All three of the above inks are printed in patterns onto terry cloth towel substrates, through a 40-mesh nylon screen, having 450 micron openings, from Advance Process Supply Company, as described above. The printed substrates are dried and cured. In each case, the ink adheres well to the substrate. The abrasive particles are held tightly in the ink matrix, whereby there is little, if any, release of the abrasive particles from the printed substrates. Printed portions of the surfaces of the printed substrates are noticeably more abrasive than unprinted portions of the same substrates.

METHOD EXAMPLE

A screen is prepared in the usual manner from 40-mesh monofilament nylon. The mesh opening is 450 microns. Mesh open surface is 48%. Thread diameter is 200 microns. The open printing pattern on the prepared screen comprised a first area in which about 90% of the screen is open to passage of ink therethrough. The first area represented about 8% of the surface area of the substrate to be printed, which is a terry cloth towel. The printing pattern comprises a second area representing about 3% of the surface area of the substrate. About 50% of the screen in the second area is open to passage of ink therethrough. Ink is prepared according to INK EXAMPLE 1 except that the abrasive particles are added to ink at the rate of 16 ounces abrasive particles per gallon of ink.

The towel substrate is placed under the screen. The mixed ink is placed on the screen and pushed through the screen with a squeegee in the usual manner, and thereby printed onto the towel.

The printed towel is then dried and cured in an oven at about 300 Fahrenheit for about three minutes. The resulting towel has the desired composite printed abrasive pattern over about 11% of its surface. About 8% is more or less solidly printed. The intermittent abrasive pattern covers about 3% of the towel surface. Accordingly, about 89% of the towel surface remains unaffected by the abrasive printing, whereby that portion of the towel generally maintains its original softness and absorbency.

While choosing to not be bound by theory, it is believed that the ink base, in addition to serving the primary printing function, serves a second important function, during the step of forcing the ink through the screen. The viscosity of the ink is such that it acts like a paste. It is viscous enough that it does not conform to the shape of a container (e.g., it is non-liquid). Yet it is soft enough that it is easily deformed as by a flexible squeegee. Further, it is smooth and relatively homogeneous, except for the included abrasive particles. These and other properties of such screen printing inks, provide in such inks the secondary property of lubrication, generally separating the screen threads from the abrasive particles while the particles are being forced through the openings in the screen. In such lubrication, the viscosity of the ink base generally reduces direct contact between the abrasive particles and the screen thread, compared to a less viscous ink base. Consequently, particles whose size (e.g., 150-300 microns) approaches the size of the screen opening (e.g., 450 microns) are readily passed/pushed through the screen.

According to the above description, this invention provides a modified screen printing ink that includes abrasive particles therein.

The invention further provides a method of printing, through a screen, an ink modified with abrasive particles, which ink, when applied to a soft or smooth substrate, imparts an abrasive characteristic to the substrate surface, in addition to the typical visual printed appearance.

Still further, the invention provides a printed article comprising a substrate which generally does not have an abrasive surface, and which has an abrasive area printed thereon.

Those skilled in the art will now see that certain modifications can be made to the embodiment shown, including related ink compositions both water-based and solvent-based compositions. Other screen sizes can be used, so long as the ink viscosity is adjusted as necessary, and the size of the abrasive particles is selected accordingly. Yet further, different sizes of abrasive particles can be selected so long as the screen opening is selected accordingly as needed to provide at least the minimum opening required. All the above modifications can be made without departing from the spirit of the instant invention.

While the invention has been described with respect to its preferred embodiment, it will be understood that the invention is adapted to numerous rearrangements, modifications, and alterations, and all such arrangements, modifications, and alterations are intended to be within the scope of the appended claims.

Having thus described the invention, what is claimed is:

1. A method of screen printing wherein an ink formulation is pressed through a substantially conventional screen having a plurality of individual strands in woven-like array defining a mesh with openings between the strands, and wherein the screen conventionally has a blocked portion thereof blocking passage of ink through the screen thereat whereby ink may only pass through the multistrand mesh openings at the remaining unblocked portion of the screen, said method comprising the steps of:
  (a) selecting as an ink base an ink having a viscosity of about 2,000 to about 50,000 centipoises at ambient conditions;
  (b) combining with said ink base hard abrasive particles having roughened and irregular surfaces including generally sharp edges to form an abrasive ink formulation, said particles having a size to pass through said mesh screen openings;
  (c) mixing said ink base and said particles to obtain a substantially uniform dispersion of said particles in said ink base;
  (d) pressing said abrasive ink formulation through said screen onto a printable substrate thereby to print said abrasive ink formulation on said substrate; and,
  (e) drying said ink formulation on said substrate thereby to provide an abrasive texture thereon.

2. A method as in claim 1 and including combining said abrasive particles and said ink base in a relationship of about 2 ounces to about 70 ounces of abrasive particles per gallon of said ink base.

3. A method as in claim 2 wherein said substrate has a definable first unit surface area, and including the step of selecting a first print pattern having a second unit surface area, said second unit surface area comprising dimensions defining an area corresponding to between about 5% and about 70% of said first unit surface area of said substrate, creating a pattern on said screen corresponding to said first print pattern, and printing said modified ink onto said substrate in said first print pattern, through said screen, to thereby define (i) a first unit surface area portion printed by said modified ink, said first unit surface area portion being contained in said first unit surface area and comprising from about 5% to about 70% of said first unit surface area, and (ii) a second unit surface area portion contained in said first unit surface area, no part of either one of said first and second unit surface area portions being contained in the other of said first and second unit surface area portions.

4. A method as in claim 3 and including selecting, as components of said first print pattern, (i) a first print area to be printed on said first unit surface area of said substrate, said first print area comprising a first solid print pattern portion wherein said abrasive ink, when printed on said substrate to create a printed said first unit surface area portion, covers from about 80% to about 100% of the surface of said first print area, (ii) a second print area to be printed on said second unit surface area of said substrate, said second print area comprising a second print pattern portion wherein said abrasive ink, when printed on said substrate to create a printed said first unit surface area, covers about 10% to about 80% of the surface of said second print pattern portion, and (iii) a third area, corresponding to said third unit surface area of said substrate, and comprising less than 10% coverage by said abrasive ink formulation.

5. A method as in claim 2 and including printing said abrasive ink formulation onto a compressible absorptive fabric.

6. A method as in claim 1 wherein said substrate has a definable first unit surface area, and including the step of selecting a first print pattern having a second unit surface area, said second unit surface area comprising dimensions corresponding to between about 5% and about 70% of said first unit surface area of said substrate, creating a pattern on said screen corresponding to said first print pattern, and printing said modified ink onto said substrate in said first print pattern, through said screen, to thereby define (i) a first unit surface area portion printed by said modified ink, said first unit surface area portion being contained in said first unit surface area and comprising rom about 5% to about 70% of said first unit surface area, and (ii) a second unit surface area portion contained in said first unit surface area, no part of either of said first and second unit surface area portions being contained in the other of said first and second unit surface area portions.

7. A method as in claim 6 and including selecting, as components of said first print pattern, (i) a first print area to be printed on said first unit surface area of said substrate, said first print area comprising a first solid print pattern portion wherein said abrasive ink, when printed on said substrate to create a printed said first unit surface area portion, covers from about 80% to about 100% of the surface of said first print area, (ii) a second print area to be printed on said second unit surface area of said substrate, said second print area comprising a second print pattern portion wherein said abrasive ink, when printed on said substrate to create a printed said first unit surface area portion, covers about 10% to about 80% of the surface of said second print pattern portion, and (iii) a third area, corresponding to said third unit surface area of said substrate, and comprising less than 10% coverage by said abrasive ink formulation.

8. A method as in claim 7 and including printing said abrasive ink formulation onto a compressible absorptive fabric.

9. A method as in claim 6 and including printing said abrasive ink formulation onto a compressible absorptive fabric.

10. A method as in claim 1 and including printing said abrasive ink formulation onto a compressible absorptive fabric.

11. A method as in claim 1 and including selecting as said ink base, a standard screen printing ink having a viscosity of about 10,000 to about 30,000 centipoise.

12. An ink composition adapted for screen printing onto a substrate by pushing said ink composition through a screen, the screen having a mesh count and mesh openings corresponding to the mesh count and mesh openings in conventional screen printing screens, said ink composition comprising:
  (a) as an ink base, a standard screen printing ink comprising a colorant, a resin, and a solvent, said ink base having a viscosity at ambient conditions of about 2,000 to about 50,000 centipoise; and (b) abrasive particles having generally irregular and roughened surfaces including sharp edges substantially uniformly dispersed in said ink base, said abrasive particles being cooperatively sized to pass through the screen.

13. An ink composition as in claim 12, said ink base having a viscosity, at ambient conditions, of about 10,000 to about 30,000 centipoise.

14. An ink composition as in claim 13, the relative amounts of said ink base and said abrasive particles being about 2 ounces to about 70 ounces of abrasive particles per gallon of ink base.

15. An ink composition as in claim 12, the relative amounts of said ink base and said base abrasive particles being about 2 ounces to about 70 ounces of abrasive particles per gallon of said ink base.

16. A method of printing wherein an ink is pushed through a screen, said screen having mesh count and mesh opening corresponding to mesh count and mesh opening in conventional screen printing screens, said method comprising the steps of:

(a) selecting, as an ink base, an ink having a viscosity, at ambient conditions, of about 2,000 to about 50,000 centipoise;

(b) combining, with said ink base, hard abrasive particles having roughened and irregular surfaces including sharp edges, to form a modified abrasive ink formulation, said hard abrasive particles being cooperatively sized to readily pass through said mesh opening in said screen;

(c) mixing said modified ink and thereby obtaining a uniform dispersion of said particles said ink base;

(d) pushing said modified ink formulation through said screen, onto a printing substrate, and thereby printing said abrasive ink formulation onto said substrate; and (e) drying said ink on said substrate, whereby said printed substrate exhibits an abrasive texture.

17. A method as in claim 16 and including combining said abrasive particles and said ink base in a relationship of about 2 ounces to about 70 ounces of abrasive particles per gallon of said ink base.

18. A method as in claim 16 and including selecting as said ink base, a standard screen printing ink having a viscosity of about 10,000 to about 30,000 centipoise.

* * * * *